United States Patent
Paris et al.

(10) Patent No.: US 7,644,642 B2
(45) Date of Patent: Jan. 12, 2010

(54) HANDLEBAR TOP CLAMP FOR STEERING SYSTEMS

(75) Inventors: Joshua A. Paris, Portland, OR (US); Kelly Anson, Vancouver, WA (US)

(73) Assignee: Promoto Billet, Nampa, ID (US)

( * ) Notice: Subject to any disclaimer, the term of this patent is extended or adjusted under 35 U.S.C. 154(b) by 150 days.

(21) Appl. No.: 10/778,906

(22) Filed: Feb. 13, 2004

(65) Prior Publication Data

US 2005/0040621 A1      Feb. 24, 2005

Related U.S. Application Data

(60) Provisional application No. 60/447,649, filed on Feb. 14, 2003.

(51) Int. Cl.
*B62K 21/12* (2006.01)
*B62J 9/00* (2006.01)
*B62J 27/00* (2006.01)

(52) U.S. Cl. .................. 74/551.8; 74/551.1; 280/288.4; 280/304.3

(58) Field of Classification Search ................ 74/551.1, 74/551.3, 551.8, 551.9; 280/288.4, 304.3
See application file for complete search history.

(56) References Cited

U.S. PATENT DOCUMENTS

| | | | | |
|---|---|---|---|---|
| 602,016 A | * | 4/1898 | Johnson | 74/551.1 |
| 2,059,669 A | * | 11/1936 | Skoog | 74/551.1 |
| 2,063,493 A | * | 12/1936 | Douglas | 74/551.8 |
| 3,832,912 A | * | 9/1974 | Edwards | 74/551.8 |
| 4,438,661 A | * | 3/1984 | Cullen | 74/551.9 |
| 5,195,394 A | * | 3/1993 | Latta | 74/551.8 |
| 5,829,316 A | * | 11/1998 | Krizman, Jr. | 74/551.8 |
| 6,035,741 A | * | 3/2000 | Krizman, Jr. | 74/551.8 |
| 6,439,079 B1 | * | 8/2002 | Kao | 74/551.8 |
| 2004/0217243 A1 | * | 11/2004 | Laivins et al. | 248/230.1 |

FOREIGN PATENT DOCUMENTS

| | | | |
|---|---|---|---|
| GB | 2138755 A | * | 10/1984 |
| WO | WO94/27859 A1 | * | 12/1994 |

* cited by examiner

*Primary Examiner*—Thomas R Hannon
*Assistant Examiner*—Justin Krause
(74) *Attorney, Agent, or Firm*—Kunzler & McKenzie

(57) ABSTRACT

A top clamp for steering systems used in cycles, such as motorcycles, is provided. The top clamp may be adapted to allow a hand guard crossbar to couple directly thereto. The top clamp may also have a steering damper mount plate adjustably coupled thereto to enable the movement of the handlebars from a forward position to a rearward position without causing the steering damper to move from axial alignment with the axial center of a steering tube.

21 Claims, 2 Drawing Sheets

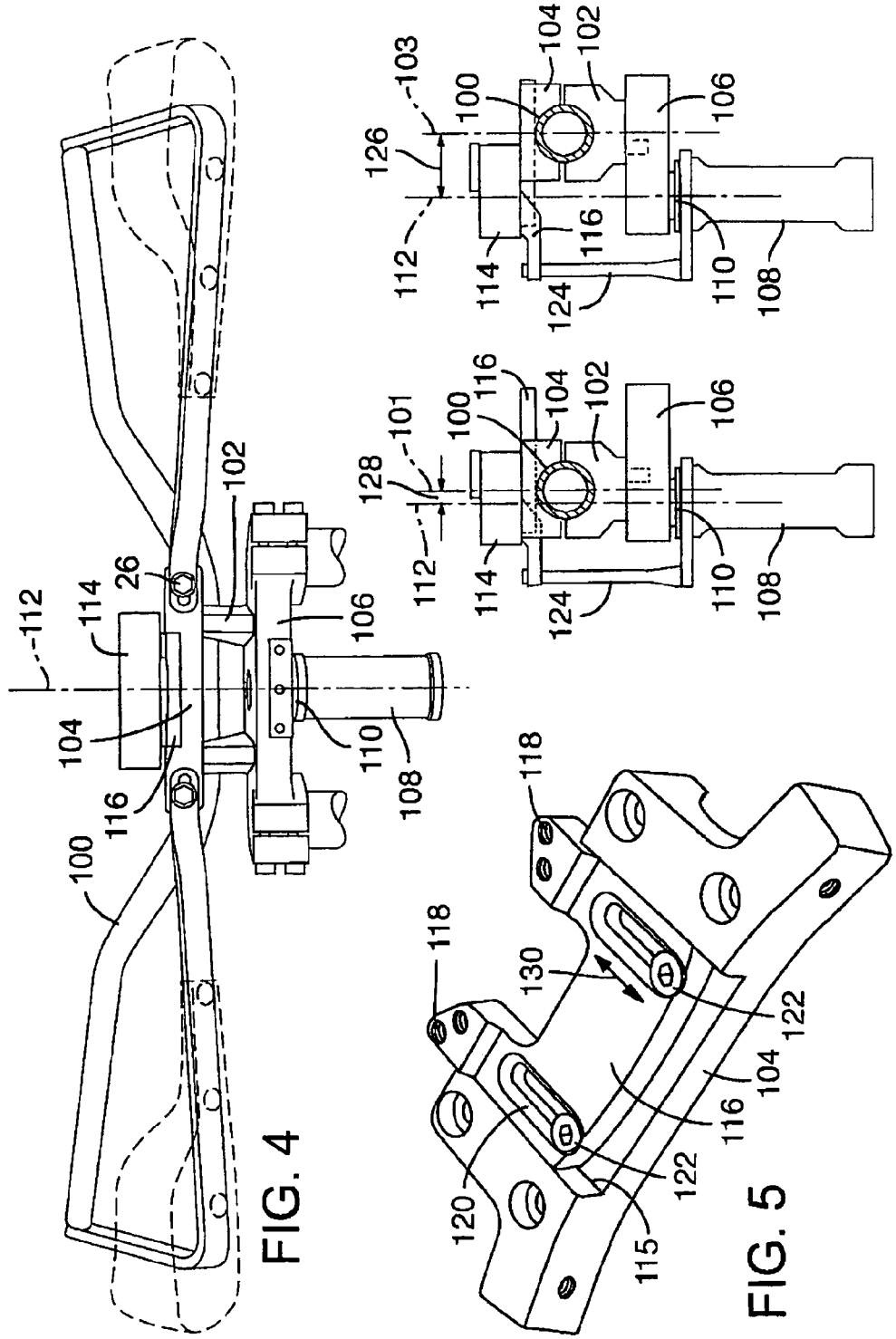

HANDLEBAR TOP CLAMP FOR STEERING SYSTEMS

RELATED APPLICATION

This application is a non-provisional application of provisional application Ser. No. 60/447,649, filed on Feb. 14, 2003, titled "INTEGRATED HAND GUARD SYSTEM," claims priority to said provisional application, and fully incorporates its specification and drawing by reference.

FIELD OF THE INVENTION

Disclosed embodiments of the invention relate to the field of steering systems on motorcycles and all-terrain vehicles, and more particularly embodiments of the invention relate to top clamps configured to improve hand guard systems and steering dampening systems.

BACKGROUND OF THE INVENTION

Most cycles, including motorcycles, all-terrain vehicles (ATV), bicycles and the like, include a handlebar configuration that includes opposing outer ends and a middle portion. The handlebars are typically rotatably fixed at the middle portion, towards the center of the cycle. Usually, especially with motorcycles, the middle portion of the handlebars are fixed through the use of a clamping system that includes at least one bottom bar clamp, which is usually integrated with or carried by a triple clamp, and one or more corresponding top bar clamps. Both the bottom bar clamp and the top bar clamp may have a recessed portion generally sized to curvedly engage or cradle a portion of the circumference of the handlebar. The top and bottom clamps are then secured to each other to clamp the handlebars and prevent them from rotating frontward or backward or moving from left to right.

The rider steers the cycle by pushing on one end of the handlebar or the other. To protect a rider's hands and controls mounted on the outer ends of the handlebar, such as brake levers and clutch levers, a rigid hand guard crossbar may extend from the outer end of the handlebar in a forward fashion and then curve inward toward the center of the cycle. Most crossbars then clamp to the handlebar at a point more toward the middle portion of the handlebar, outside of the clamped area. The crossbar helps prevent brush, tree branches and other obstacles from interfering with the rider's hands and controls. The crossbar also can help protect hands and controls upon impact in the event of a crash.

Current hand guard cross members that connect to the inner portion of the handlebar, allow the crossbar to rotate upward or downward depending on the directional forces caused by the impact of hitting an obstacle or a crash. This is a serious safety concern, as it significantly reduces the effectiveness of the crossbar in protecting the rider's hands and controls.

The only other known hand guard system is to secure the inner portion of the crossbar to a bracket that extends from pinch bolts that are used to secure the triple clamp to a fork of the cycle. This connection undesirably stiffens the handlebars such that they are not allowed to naturally flex per their design, which takes a toll on the rider and increases the time to rider fatigue.

Another safety and performance feature used with the steering system in cycles includes a steering damper. Steering dampers are designed to absorb unwanted left to right motion in the handlebars, sometimes known as headshake or wobble and helps eliminate the sudden thrust effect of having the handlebars pulled from the rider's hands when the front wheel hits sharp-edged objects, such as tree roots, potholes, uneven pavement, ruts and the like. To properly function, steering dampers must be positioned in axial alignment with the axial center or centerline of the steering tube, to which the handlebars and front wheel pivot around. Accordingly, a steering damper is typically mounted at the middle portion of the handlebar. By being axially aligned with the axial center, the steering damper can influence the ability of the wheel and handlebar to turn from one side to the other, by creating a rider set resistance.

Steering dampers are usually mounted to the top bar clamp. A linkage extends to interconnect the damper with the center bearing of the steering tube. Because steering dampers are rigidly connected to a top bar clamp, they are suitable for a single handlebar position. However, many original equipment manufacturers (OEM) and after-market manufacturers (AMM) design and build bottom bar clamps that have several positions, or positive stops, from closer to the rider to farther out towards the front wheel of the cycle. If a rider desires to change the position of the handlebar, they must use a different top bar clamp that will accommodate the different position while allowing the steering damper to maintain its axial alignment over the center of the steering tube. This not only has a disadvantage of requiring and maintaining several different top bar clamps, but it also restricts the rider's ability to refine the handlebar positioning without excessive parts and down time.

BRIEF DESCRIPTION OF THE DRAWINGS

The invention is illustrated by way of example and not by way of limitation in the figures of the accompanying drawings, in which the like references indicate similar elements and in which:

FIG. 4 illustrates a front view of a steering system in accordance with embodiment of the present invention;

FIG. 5 illustrates an enlarged view of the top clamp illustrated in FIG. 4 in accordance with an embodiment of the present invention;

FIG. 6A Illustrates a cross sectional view of a steering system in accordance with an embodiment of the present invention; and FIG. 6B illustrates a cross sectional view of a motorcycle steering system in accordance with an embodiment of the present invention.

DETAILED DESCRIPTION OF EMBODIMENTS OF THE INVENTION

In the following detailed description, reference is made to the accompanying drawings that form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
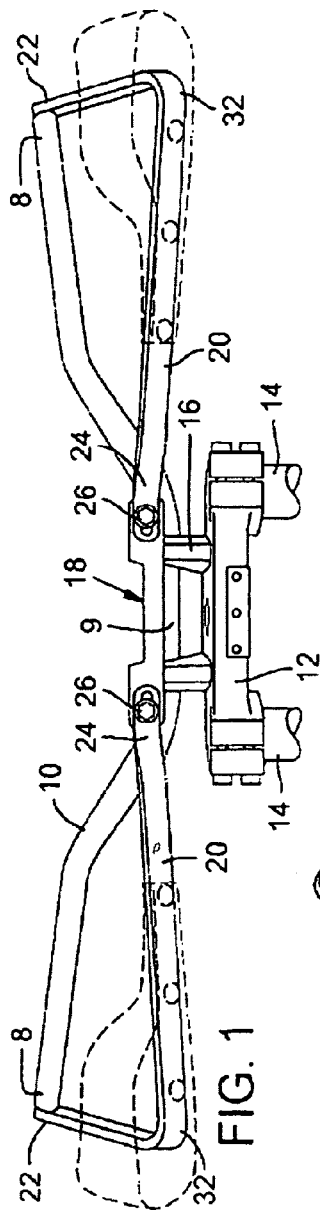
FIG. 1 illustrates a front view of a handlebar and hand guard system in accordance with embodiment of the present invention.

FIG. 1 illustrates a front view of a handlebar and hand guard system in accordance with embodiment of the present invention. Handlebar 10 has outer portions 8 and an inner portion 9. Handlebar 10 may be secured to a cycle, such as a motorcycle, by bottom bar clamp 16 and top clamp 18. Bottom bar clamp 16 may be coupled to triple clamp 12 and have a curved portion corresponding to the curvature of the handlebar 10 such that it can receive and cradle handlebar 10. Top clamp 18 may have a first portion that is curved such that it corresponds to the curvature of the handlebar 10. The first portion may be positioned over the handlebar 10 and the top clamp 18 may be secured to lower bar clamp 16 to clamp handlebar 10 in a fixed position.

Crossbar 20 may be part of a hand guard system that can protect a rider's hand as well as the controls that may be mounted to handlebar 10, such as clutch levers, brake levers, cabling and the like, from damage due to obstacles encountered or impact in the event of a crash. Crossbar 20 has an outer end 22, which may be configured to couple to the outer ends 8 of handlebar 10. Crossbar 20 may also have an inward directed portion 24 that may be adapted to couple to a second portion of the top clamp 18. Inward directed portion 24 may be coupled to top clamp 18 in a number of ways, including, but not limited to, using a threaded bolt, clamp, or other fasteners.

Coupling the inward directed portion 24 of crossbar 20 to top bar mount 18 provides a number of benefits that enhance rider's safety and comfort. For example, handlebar 10 are typically designed and manufactured to have a certain degree of flex, which can absorb some of the forces caused by rough terrain and thereby reduce a rider's fatigue. Securing the inward directed portion 24 of crossbar 20 to top clamp 18 may allow handlebar 10 to maintain the designed degree of flex. And, securing the inner portion 24 of crossbar 20 to the top clamp 18 may prevent undesirable rotation of the crossbar 20 due to impact from a crash or obstacles, thus better protecting the rider's hands as well as the controls.

Figure 2:
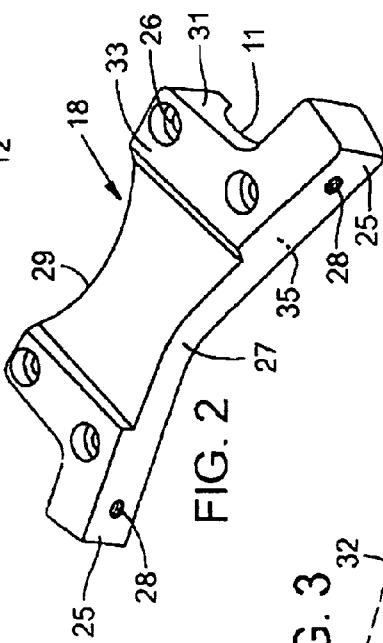
FIG. 2 illustrates an enlarged view of the top clamp illustrated in FIG. 1 in accordance with an embodiment of the present invention.

FIG. 2 illustrates an enlarged view of the top clamp illustrated in FIG. 1 in accordance with an embodiment of the present invention. Top clamp 18 may include curved first portion 11, which can engage a handlebar. The handlebar can be secured by clamping the top clamp 18 to a bottom clamp (not shown) by, for example, extending threaded bolts through apertures 26. Top clamp 18 may have a second portion adapted to allow the inward directed portion of the crossbar to couple to the top clamp 18. The second portion may include, but is not limited to, a forward edge 27, a rearward edge 29, opposing side edges 31, a top surface 33 and a bottom surface 35.

Top clamp 18 may have a forward protrusion 25 that extends outwardly in a substantially parallel manner to the inwardly directed portion of a crossbar (not shown), which may also be the second portion to which the crossbar may couple. Forward protrusion 25 may give added support to crossbar, and thereby improve the strength of the crossbar to resist twisting or deformation as a result of an impact. The crossbar may also, for example, be secured to the forward edge 27. Coupling of the crossbar to the second surface, such as the forward protrusion 25, may occur in a number of ways. For example, a threaded aperture 28 may be provided in forward protrusion 25 such that the crossbar inward portion of the crossbar may be bolted to the top bar clamp.

Again, it can be appreciated that the inner portion of the crossbar may be secured to the top clamp 18 in a variety of ways and in a variety of locations. For example, though not shown, a single one piece crossbar may be used that extends from one end of the handlebar, across the center of the cycle to the other end of handlebar. The center of the crossbar may be shaped to conform to the forward edge of the top clamp, which can provide support to the entire crossbar. The center of the crossbar may be secured along the forward edge of the top clamp by a bolt, clamp or other securing system. The crossbar could also couple with the top clamp where the second portion is the bottom surface 35. This could be accomplished, for example, by inserting the inward directed portion of the crossbar between the bottom clamp and the top clamp, and the bolt that secures the two together to clamp the handlebar in a fixed position could also secure the inward directed portion.

Figure 3:
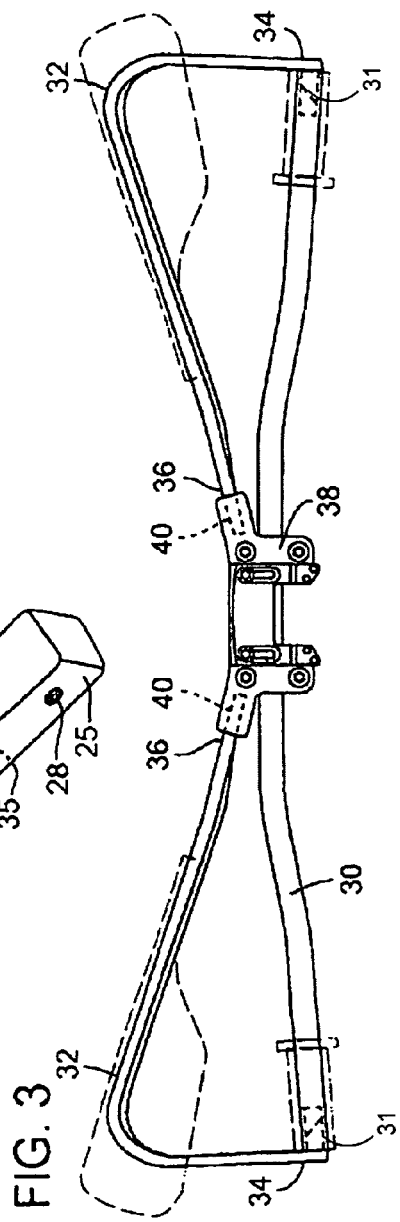
FIG. 3. Illustrates a top view of a handlebar and hand guard system in accordance with an embodiment of the present invention.

FIG. 3. Illustrates a top view of a handlebar and hand guard system in accordance with an embodiment of the present invention. Handlebar 30 may be secured to the cycle by top clamp 38 to prevent rotation and undesired movement. Mounting mechanism 31 connects crossbar 32 to handlebar 30 at its outer portion 34, and the crossbar 32 extends forwardly and inwardly toward the center of the cycle. The mounting mechanism 31, as depicted, is cylindrical with a diameter selected to be insertable into the outer end of the handlebar 30 such that the mounting mechanism 31 engages an inner surface of the handlebar. Inwardly directed portion 36 may couple to top clamp 38 through a receiving aperture 40. Inwardly directed portion 36 of crossbar 32 can insertably nest in aperture 40. Inwardly directed portion 36 may be retained in aperture 40 by having outer end 34 being coupled to the outer portion of handlebar 30. For additional support, inwardly directed portion 36 may also be held in place, for example, by bolt, clamp or other fastener that may pass through the top clamp and the inwardly directed portion of the crossbar.

It can be appreciated by one of skill in the art that the inward directed portion of the crossbar may be secured to the top clamp in a variety of ways and those that are illustrated are example embodiments in accordance with the present invention. It can further be appreciated that the top clamp may be separated into two or more pieces that may correspond to separate bottom clamps. In such a case, the inwardly directed portion of the left crossbar, for example, may be coupled to left top clamp and the right crossbar may be coupled to the right top clamp.

FIG. 4 illustrates a front view of a steering system in accordance with embodiment of the present invention. Handlebar 100 may be secured between bottom bar clamps 102, carried by triple clamp 106, and top clamp 104. The triple clamp 106 is pivotally coupled to the cycle's steering tube 108. Center bearing 110 allows the triple clamp 106, and thus the handlebar 100 to pivot about the steering tube 108. A steering damper 114 may be secured to damper mount plate 116. Steering damper 116 may be linked to the steering tube 108 through a linkage (not shown, but an example of which is shown in FIGS. 6A and 6b as 124), such that steering damper 116 will influence the movement of the handlebars from side to side.

In order for the steering damper 114 to properly function, its center point must be axially aligned with the axial center of the steering tube 108 and center bearing 110, which is shown by centerline 112. Thus, maintaining axial alignment of the steering damper 114 with the centerline 112 of the steering tube 108 is paramount. If the rider desires to change the position of the handlebars 100 relative to the rider, which many OEMs and after-market steering setups allow, the top clamp 104 must move with the handlebar 100, but the steering damper cannot move, otherwise it will not maintain in axial alignment with centerline 112 of steering tube 108. To allow for such movement of the top clamp 104, damper mount plate 116 may be configured to slidably adjust with respect to the top clamp 104, such that different handlebar positions can be accommodated without the need for numerous different top clamps.

FIG. 5 illustrates an enlarged view of the top clamp illustrated in FIG. 4 in accordance with an embodiment of the present invention. A steering damper (not shown) may be secured to damper mount plate 116 through apertures 118, and axially aligned with the centerline of the steering tube (not shown). Damper mount plate may be sized to slidably engage a groove 115 in top clamp 104. Fasteners 122 may secure the damper mount plate 116 in the position that allows for steering damper 114 to maintain proper axial alignment.

Should a different handlebar position be desired, damper mount plate 116 may have elongated apertures 120 disposed therein to allow front to rear movement, shown by directional arrow 130. To move the top clamp 104, and thus the handlebars, while maintaining the axial alignment of the steering damper with the center line of the steer tube, fasteners 122 may be loosened and the top clamp 104 can be slid forward or rearward as required. The steering damper and the damper mounting plate 116 can remain relatively fixed despite the movement of top bar clamp 104. Once the handlebars are in the desired position, fasteners 122 may be tightened so as to secure the position of the damper mount plate with respect to the top clamp 104, such that they will no longer move with respect to each other. It can be appreciated by one skilled in the art that fasteners 122 may be threaded bolts, clamps or other devices that allow the damper mount plate to move when desired, but may secure the damper mount plate in a fixed position relative to the top clamp as needed.

FIGS. 6A and 6B illustrate cross-sectional views of a steering assembly in accordance with embodiments of the present invention. FIG. 6A Illustrates a cross-sectional view of a steering assembly where handlebar 100 is clamped between bottom clamp 102 and top clamp 104 in a first position with handlebar 100 having a center point shown by 101. Steering damper 114 is axially aligned with centerline 112 of steer tube 108. In such a first position, the center point 101 is close to the center line 112. This configuration leaves the handlebars positioned more rearward toward the rider.

FIG. 6B Illustrates a cross-sectional view of a motorcycle steering assembly where the handle bar 100 is clamped between the bottom clamp 106 and the top clamp 104 in a second position with the handlebar 100 having a center point shown by 103. With center point 103, the handlebars are positioned farther forward, away from the rider. To move the top clamp 104 forward, without causing the steering damper 114 to move out of axial alignment with centerline 112 of steering tube 108, damper mount plate 116 may be loosened with respect to top clamp 104 such that top clamp 104 may move forward and the damper mount plate 116 and steering damper can remain in a relatively fixed position. In the second position, the distance 126 between the center point 103 and the centerline 112 of steering tube 108 can be maximized or adjusted as required by the rider and allowed by the handlebar mounting configurations.

It can be appreciated by one of skill in the art that the handlebars 100 can be positioned anywhere that the OEM or AM of the triple clamps and bottom clamps provide positive stops for handlebar positioning. The adjustability of the damper mount plate 116 may allow for a single top clamp 104 to be used, regardless of the handlebar position chosen by the rider.

As shown in the illustrated embodiments in accordance with the present invention, the damper mount plate 116 is sized to fit in a groove of top clamp 104. Such a configuration provides strength and rigidity to the damper mount plate as well as make slidable adjustment more controlled. It can be appreciated, however, that the damper mount plate could slide on the top of the top clamp without such a groove. Or, as another example, a track and groove system could be used which would help keep the damper mount plate from twisting from side to side during the adjustment process.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A device for securely fastening a handlebar to a vehicle frame, the device comprising:
    a handlebar crossbar;
    a handlebar clamp having a first portion curved to engage a handlebar;
    a plurality of apertures formed in the handlebar clamp and adjacent the first portion, and having a diameter selected to engage a fastening device such that the fastening device engages a second handlebar clamp to couple the first portion and the handlebar to a vehicle frame;
    a second portion having a flat surface corresponding to a flat surface of the handlebar crossbar to rigidly engage an inward directed portion of the handlebar crossbar such that the handlebar crossbar is substantially prevented from rotational movement with respect to the handlebar; and
    the handlebar crossbar having an outer end and a mounting mechanism on the outer end for rigidly coupling with an outer end of the handlebar such that the handlebar crossbar is fixed in a position relative to the handlebars and resistant to movement during an impact.

2. The device of claim 1, wherein the second portion includes a forward protrusion extending outwardly from the second portion, and wherein the forward protrusion engages the inward directed portion of the handlebar crossbar such that the handlebar crossbar is oriented substantially non-parallel to a longitudinal axis defined by a middle portion of the handlebar.

3. The device of claim 2, wherein the forward protrusion includes an aperture sized to allow the inward directed portion of the handlebar crossbar to nest therein.

4. The device of claim 1, further comprising a fastening device that couples the inward directed portion of the crossbar to the second portion, wherein the fastening device attaches in a direction that is substantially orthogonal to a direction of attachment of the mounting mechanism so as to torsionally prevent rotation of the handlebar crossbar.

5. The device of claim 1, wherein the wherein the handlebar crossbar extends forwardly and inwardly from the outer end of the handlebar to the handlebar clamp.

6. The device of claim 1, further comprising a handlebar crossbar coupling portion that is disposed on an exterior surface of the second portion.

7. The device of claim 6, wherein the exterior surface is located on a selected one of a forward edge, a side edge, a rear edge, a top surface, and a bottom surface of the second portion.

8. The device of claim 1, wherein the first portion is configured to engage an inner portion of the handlebar, the inner portion being disposed substantially halfway between a first outer end of the handlebar and a second outer end of the handlebar.

9. A system for securely fastening a handlebar to a vehicle frame, the system comprising:
   a handlebar having a first end that engages a first mounting mechanism, and a second end that engages a second mounting mechanism;
   wherein the first mounting mechanism rigidly connects the first end of the handlebar with an outer end of a first crossbar;
   wherein the second mounting mechanism rigidly connects the second end of the handlebar with an outer end of a second crossbar;
   a top handlebar clamp having a first portion curved to engage a handlebar the first portion forming a first partial cylindrical aperture;
   a bottom handlebar clamp having a second partial cylindrical aperture such that the first and second partial cylindrical apertures together form a cylindrical aperture that engages a center portion of the handlebar:
   a plurality of apertures formed in the top handlebar clamp adjacent the first portion, and having a diameter selected to engage a fastening device such that the fastening device engages the bottom handlebar clamp to couple the top handlebar clamp and the handlebar to a vehicle frame; and
   a second portion having a flat surface corresponding to a flat surface of the crossbar to rigidly engage an inward directed portion of the crossbar such that the crossbar is substantially prevented from rotational movement with respect to the handlebar.

10. The system of claim 9, wherein the second portion includes a forward protrusion extending outwardly from the second portion, wherein the forward protrusion is coupled to the inward directed portion of a crossbar in a manner such that the inward directed portion of the hand guard crossbar is oriented substantially non-parallel to an axis defined by a middle portion of the handlebar.

11. The system of claim 10, wherein the forward protrusion includes an aperture sized to allow the inward directed portion of the crossbar to nest therein.

12. The system of claim 9, further comprising a fastening device that couples the inward directed portion of the crossbar to the second portion, wherein the fastening device attaches in a direction that is substantially orthogonal to a direction of attachment of the mounting mechanism.

13. The system of claim 9, wherein the handlebar is tubular and the mounting mechanism is cylindrical and has a diameter selected to engage an inner surface of the handlebar.

14. The system of claim 9, wherein the second portion is disposed on an exterior surface of the first portion.

15. The system of claim 14, wherein the exterior surface is located on a selected one of a forward edge, a side edge, a rear edge, a top surface, and a bottom surface of the first portion.

16. The system of claim 9, wherein the first portion is configured to engage an inner portion of the handlebar, the inner portion of the handlebar being disposed substantially halfway between the first end of the handlebar and a second end of the handlebar.

17. A handlebar mounting clamp, comprising:
   a mounting portion including a lower clamp piece having an elongated first curved portion and an upper clamp piece having an elongated second curved portion, the first and the second curved portions being cooperatively configured to define a generally tubular opening that engages a handlebar and defines a longitudinal axis;
   a forward protrusion extending outwardly from the mounting portion such that the forward protrusion is oriented substantially non parallel to the longitudinal axis;
   a handlebar crossbar having a mounting mechanism on an outer end that rigidly couples the handlebar crossbar to an outer end of the handlebar, the handlebar crossbar extending forwardly and inwardly from the outer end of the handlebar to mounting portion;
   wherein the forward protrusion couples to an inward directed portion of the handlebar crossbar; and
   wherein the inward directed portion of the handlebar crossbar is oriented substantially-parallel to the forward protrusion.

18. The handlebar mounting clamp of claim 17, wherein the forward protrusion includes an aperture sized to allow the inward directed portion of the crossbar to nest therein.

19. The handlebar mounting clamp of claim 17, further comprising a fastening device that couples the inward directed portion of the crossbar to the second portion, wherein the fastening device attaches in a direction that is substantially orthogonal to a direction of attachment of the mounting mechanism so as to torsionally prevent rotation of the handlebar crossbar.

20. The handlebar mounting clamp of claim 17 wherein the lower and upper clamp pieces are configured to couple to a motorcycle frame.

21. The handlebar mounting claim of claim 17, wherein the forward protrusion is rigidly coupled to the inward directed portion such that the crossbar is resistant to rotational movement relative to the mounting clamp when a force is applied to the crossbar.

* * * * *

UNITED STATES PATENT AND TRADEMARK OFFICE
CERTIFICATE OF CORRECTION

PATENT NO. : 7,644,642 B2  Page 1 of 1
APPLICATION NO. : 10/778906
DATED : January 12, 2010
INVENTOR(S) : Joshua Paris et al.

It is certified that error appears in the above-identified patent and that said Letters Patent is hereby corrected as shown below:

Column 2, Line 37
"in accordance with embodiment"---should read "in accordance with an embodiment"

Column 2, Line 46
"in accordance with embodiment"---should read "in accordance with an embodiment"

Column 6, Line 62
"claim 1, wherein the wherein the handlebar"---should read "claim 1, wherein the handlebar"

Signed and Sealed this

Twenty-third Day of February, 2010

David J. Kappos
*Director of the United States Patent and Trademark Office*